US012761748B2

(12) United States Patent
Kang et al.

(10) Patent No.: US 12,761,748 B2
(45) Date of Patent: Oct. 13, 2026

(54) TOUCH SENSOR DEVICE, DISPLAY DEVICE INCLUDING THE TOUCH SENSOR DEVICE AND ELECTRONIC DEVICE INCLUDING THE DISPLAY DEVICE

(71) Applicant: Samsung Display Co., Ltd., Yongin-Si (KR)

(72) Inventors: Jeonmin Kang, Yongin-si (KR); Taehyeon Yang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/238,523

(22) Filed: Jun. 16, 2025

(65) Prior Publication Data

US 2026/0072538 A1 Mar. 12, 2026

(30) Foreign Application Priority Data

Sep. 11, 2024 (KR) ........................ 10-2024-0123628

(51) Int. Cl.
*G06F 3/041* (2006.01)

(52) U.S. Cl.
CPC .................................. *G06F 3/0416* (2013.01)

(58) Field of Classification Search
CPC ..................................................... G06F 3/0416
See application file for complete search history.

(56) References Cited

U.S. PATENT DOCUMENTS

| | | | | |
|---|---|---|---|---|
| 11,614,844 | B2 | 3/2023 | Kim et al. | |
| 2011/0156800 | A1* | 6/2011 | Lee | H03K 17/96 327/551 |
| 2011/0261007 | A1* | 10/2011 | Joharapurkar | G06F 3/0446 345/174 |
| 2012/0188183 | A1* | 7/2012 | Heo | G06F 3/0416 345/173 |
| 2015/0290409 | A1* | 10/2015 | Bonassa | A61M 16/205 128/204.21 |
| 2020/0366827 | A1* | 11/2020 | Lee | H04N 25/447 |
| 2021/0064178 | A1* | 3/2021 | Steiner | G06F 3/0416 |
| 2021/0141486 | A1* | 5/2021 | Yamada | G06F 3/0446 |
| 2021/0389839 | A1* | 12/2021 | Kwak | G06F 3/14 |
| 2023/0280857 | A1* | 9/2023 | Komatsu | H10N 30/302 345/173 |

FOREIGN PATENT DOCUMENTS

KR 10-2349857 B1 1/2022

* cited by examiner

*Primary Examiner* — Antonio Xavier
(74) *Attorney, Agent, or Firm* — Innovation Counsel LLP

(57) ABSTRACT

A touch sensor device includes a touch sensor and a touch driver configured to drive the touch sensor. The touch driver is configured to determine baseline data for use as a touch recognition reference for a predetermined area of the touch sensor, define a reference area in the predetermined area, the reference area including at least two of the baseline data, determine a first maximum value and a second maximum value, the first maximum value being a maximum value of the baseline data in the reference area and a first minimum value being a minimum value o the baseline data in the reference area, and determine whether to initialize the baseline data for the predetermined area based on the first maximum value and the first minimum value.

20 Claims, 13 Drawing Sheets

FIG. 6A

| i \ j | RX1 | RX2 | RX3 | RX4 | RX5 | RX6 | RX7 | RX8 | RX9 | RX10 |
|---|---|---|---|---|---|---|---|---|---|---|
| TX1 | 0 | 1 | 2 | 3 | 4 | 5 | 6 | 7 | 8 | 9 |
| TX2 | 50 | 10000 | 6003 | 33 | 11 | 0 | 0 | 1 | 0 | 80 |
| TX3 | 133 | 302 | 298 | 355 | 360 | 356 | 105 | 23 | -11 | -64 |
| TX4 | 50 | 101 | 109 | 103 | 169 | 199 | 149 | 114 | 80 | -18 |
| TX5 | -61 | -108 | -2 | -51 | -2 | 46 | 41 | 53 | 60 | 43 |

< Wet towel touch (Case1) >

FIG. 6B

| i \ j | RX1 | RX2 | RX3 | RX4 | RX5 | RX6 | RX7 | RX8 | RX9 | RX10 |
|---|---|---|---|---|---|---|---|---|---|---|
| TX1 | 0 | 1 | 2 | 3 | 4 | 5 | 6 | 7 | 8 | 9 |
| TX2 | 50 | 10000 | 6003 | 33 | 11 | 0 | 0 | 1 | 0 | 80 |
| TX3 | 367 | 127 | -140 | -200 | -201 | -212 | -208 | -210 | -206 | -201 |
| TX4 | 33 | -177 | -183 | -154 | -143 | -157 | -169 | 140 | -147 | -152 |
| TX5 | -91 | -117 | -48 | -78 | -56 | -45 | -58 | -48 | 5 | -41 |

< Palm touch (Case2) >

FIG. 7A

| i \ j | RX1 | RX2 | RX3 | RX4 | RX5 | RX6 | RX7 | RX8 | RX9 | RX10 |
|---|---|---|---|---|---|---|---|---|---|---|
| TX1 | 11326 (Max1) | 11319 | 11298 | 11276 | 11261 | 11190 | 11231 | 11240 | 11242 | 11260 |
| TX2 | 11320 | 11157 | 11142 | 11131 | 11124 | 11119 | 11117 | 11118 | 11121 | 11241 |
| TX3 | 11319 | 11155 | 11141 | 11129 | 11123 | 11120 | 11119 | 11097 (Min1) | 11118 | 11149 |
| TX4 | 11308 | 11150 | 11139 | 11127 | 11126 | 11110 | 11121 | 11120 | 11110 | 11138 |
| TX5 | 11298 | 11148 | 11137 | 11116 | 11128 | 11109 | 11111 | 11119 | 11113 | 11129 |

< Wet towel touch (Case1) >

FIG. 7B

| i \ j | RX1 | RX2 | RX3 | RX4 | RX5 | RX6 | RX7 | RX8 | RX9 | RX10 |
|---|---|---|---|---|---|---|---|---|---|---|
| TX1 | 11680 (Max2) | 11671 | 11669 | 11654 | 11641 | 11643 | 11651 | 11666 | 11672 | 11610 |
| TX2 | 11672 | 11582 | 11579 | 11578 | 11523 | 11400 | 11423 | 11352 | 11387 | 11520 |
| TX3 | 11668 | 11576 | 11562 | 11555 | 11420 | 11411 | 11424 | 11456 | 11494 | 11512 |
| TX4 | 11568 | 11551 | 11550 | 11549 | 11213 (Min2) | 11381 | 11378 | 11498 | 11500 | 11489 |
| TX5 | 11555 | 11546 | 11499 | 11480 | 11220 | 11290 | 11240 | 11314 | 11350 | 11449 |

< Palm touch (Case2) >

FIG. 11A

| | RX1 | RX2 | RX3 | RX4 | RX5 | RX6 | RX7 | RX8 | RX9 | RX10 |
|---|---|---|---|---|---|---|---|---|---|---|
| TX1 | 11680 | 11654 | 11540 | 11233 | 11125 | 11215 | 11321 | 11225 | 11180 | 11320 |
| TX2 | 11401 | 11157 (Max1') | 11142 | 11131 | 11124 | 11119 | 11117 | 11118 | 11121 | 11315 |
| TX3 | 11344 | 11155 | 11141 | 11129 | 11123 | 11120 | 11119 | 11097 (Min1) | 11118 | 11255 |
| TX4 | 11256 | 11150 | 11139 | 11127 | 11126 | 11110 | 11121 | 11120 | 11110 | 11234 |
| TX5 | 11249 | 11148 | 11137 | 11116 | 11128 | 11109 | 11111 | 11119 | 11113 | 11212 |

< Wet towel touch (Case1) >

SA

FIG. 11B

| | RX1 | RX2 | RX3 | RX4 | RX5 | RX6 | RX7 | RX8 | RX9 | RX10 |
|---|---|---|---|---|---|---|---|---|---|---|
| TX1 | 11680 | 11671 | 11669 | 11654 | 11641 | 11643 | 11651 | 11666 | 11672 | 11610 |
| TX2 | 11672 | 11582 (Max2') | 11579 | 11578 | 11523 | 11400 | 11423 | 11352 | 11387 | 11520 |
| TX3 | 11668 | 11576 | 11562 | 11555 | 11420 | 11411 | 11424 | 11456 | 11494 | 11512 |
| TX4 | 11568 | 11551 | 11550 | 11549 | 11213 (Min2) | 11381 | 11378 | 11498 | 11500 | 11489 |
| TX5 | 11555 | 11546 | 11499 | 11480 | 11220 | 11290 | 11240 | 11314 | 11350 | 11449 |

< Palm touch (Case2) >

SA

TOUCH SENSOR DEVICE, DISPLAY DEVICE INCLUDING THE TOUCH SENSOR DEVICE AND ELECTRONIC DEVICE INCLUDING THE DISPLAY DEVICE

CROSS-REFERENCE TO RELATED APPLICATION(S)

This application claims priority, under 35 U.S.C. § 119, to Korean Patent Application No. 10-2024-0123628 filed on Sep. 11, 2024 in the Korean Intellectual Property Office KIPO, the content of which is herein incorporated by reference in its entirety.

BACKGROUND

1. Field

Embodiments of the present inventive concept relate to a touch sensor device, a display device including the touch sensor device and an electronic device including the display device.

2. Description of the Related Art

Generally, a display device includes a display panel and a display panel driver. The display panel displays an image based on input image data, and includes a plurality of gate lines, a plurality of data lines and a plurality of pixels. The display panel driver includes a gate driver providing a gate signal to the gate lines, a data driver providing a data voltage to the data lines and a driving controller controlling the gate driver and the data driver.

The display device may further include a touch sensor device. The touch sensor device may include a touch sensor and a touch driver driving the touch sensor. A conventional touch sensor may not be able to accurately distinguish various touch types. Accordingly, a reliability of the conventional touch sensor may decrease.

SUMMARY

Embodiments of the present inventive concept provide a touch sensor device with an improved reliability.

Embodiments of the present inventive concept provide a display device including the touch sensor device.

Embodiments of the present inventive concept provide an electronic device including the display device.

In an embodiment of a touch sensor device according to the present inventive concept, the touch sensor device includes a touch sensor and a touch driver configured to drive the touch sensor. The touch driver is configured to determine baseline data for use as a touch recognition reference for a predetermined area of the touch sensor, define a reference area in the predetermined area, the reference area including at least two of the baseline data, determine a first maximum value and a first minimum value in the reference area, the first maximum value being a maximum value of the baseline data in the reference area and a first minimum value being a minimum value of the baseline data in the reference area, and determine whether to initialize the baseline data for the predetermined area based on the first maximum value and the first minimum value.

In an embodiment, the touch driver may be configured to calculate a second maximum value by applying offset data to the first maximum value, and to calculate a second minimum value by applying the offset data to the first minimum value.

In an embodiment, the touch driver may be configured to calculate a second maximum value by subtracting the offset data from the first maximum value, and to calculate a second minimum value by subtracting the offset data from the first minimum value.

In an embodiment, the touch driver may be configured to calculate a ratio of the second maximum value and the second minimum value.

In an embodiment, the ratio of the second maximum value and the second minimum value may be calculated as (OMax/OMin)*100, where OMax is the second maximum value, and OMin is the second minimum value.

In an embodiment, the touch driver may be configured to initialize the baseline data for the predetermined area only if the ratio of the second maximum value and the second minimum value is greater than a threshold value.

In an embodiment, the ratio of the second minimum value to the second maximum value may be calculated as (OMin/OMax)*100, wherein OMin is the second minimum value, and OMax is the second maximum value.

In an embodiment, the touch driver may be configured to initialize the baseline data for the predetermined area only if the ratio of the second minimum value to the second maximum value is less than a threshold value.

In an embodiment, the touch driver may be configured to initialize the baseline data for the predetermined area only if a difference between the first maximum value and the first minimum value is greater than a threshold value.

In an embodiment of a display device according to the present inventive concept, the display device includes a display panel, a display panel driver configured to drive the display panel, a touch sensor disposed on the display panel, and a touch driver configured to drive the touch sensor. The touch driver is configured to determine baseline data for a predetermined area of the touch sensor for use as a touch recognition reference, define a reference area including at least two of the baseline data, determine a first maximum value and a first minimum value in the reference area, the first maximum value being a maximum value among the baseline data in the reference area and a first minimum value being a minimum value of the baseline data in the reference area, and determine whether to initialize the baseline data for the predetermined area based on the first maximum value and the first minimum value.

In an embodiment, the touch driver may be configured to calculate a second maximum value by applying offset data to the first maximum value, and to calculate a second minimum value by applying the offset data to the first minimum value.

In an embodiment, the touch driver may be configured to calculate a ratio of the second maximum value and the second minimum value.

In an embodiment, the ratio of the second maximum value to the second minimum value may be calculated as (OMax/OMin)*100, wherein OMax is the second maximum value, and OMin is the second minimum value.

In an embodiment, the touch driver may be configured to initialize the baseline data for the predetermined area only if the ratio of the second maximum value and the second minimum value is greater than a threshold value.

In an embodiment, the touch driver may be configured to initialize the baseline data for the predetermined area only if a difference between the first maximum value and the first minimum value is greater than a threshold value.

In an embodiment of an electronic device according to the present inventive concept, the electronic device includes a processor configured to output an input control signal and input image data, a display panel, a display panel driver configured to drive the display panel based on the input control signal and the input image data, a touch sensor disposed on the display panel, and a touch driver configured to drive the touch sensor. The touch driver is configured to determine baseline data for a predetermined entire area of the touch sensor for use as a touch recognition reference, determine a reference area in the predetermined area, the reference area including at least two of the baseline data, determine a first maximum value and a first minimum value, the first maximum value being a maximum value of the baseline data in the reference area and a first minimum value being a minimum value of the baseline data in the reference area, and determine whether to initialize the baseline data for the predetermined area based on the first maximum value and the first minimum value.

In an embodiment, the touch driver may be configured to calculate a second maximum value by applying offset data to the first maximum value, calculate a second minimum value by applying the offset data to the first minimum value, and calculate a ratio of the second maximum value and the second minimum value.

In an embodiment, the ratio of the second maximum value to the second minimum value may be calculated as (OMax/OMin)*100, wherein OMax is the second maximum value, and OMin is the second minimum value.

In an embodiment, the touch driver may be configured to initialize the baseline data for the entire area only if the ratio of the second maximum value to the second minimum value is greater than a threshold value.

In an embodiment, the touch driver may be configured to initialize the baseline data for the predetermined area only if a difference between the first maximum value and the first minimum value is greater than a threshold value.

The touch sensor device, the display device including the touch sensor device and the electronic device including the display device according to embodiments of the present inventive concepts may include the touch driver. The touch driver may distinguish between a first case and a second case by comparing the threshold value and the ratio of the second maximum value and the second minimum value. The touch driver may determine whether to initialize the baseline data by distinguishing between the first case and the second case. The touch driver does not initialize the baseline data in the first case and the touch driver initializes the baseline data in the second case, so that the baseline data may be updated. The baseline data are updated, so that a touch recognition error may not occur in the touch sensor device. For example, a ghost touch, which means that the touch is recognized without the touch, may not occur in the touch sensor device. Accordingly, a reliability and a stability of the touch sensor device may be improved. The reliability and the stability of the touch sensor device is improved, so that a reliability and a stability of the display device including the touch sensor device may be improved.

In addition, the touch driver does not initialize the baseline data in the first case, so that a power consumption of the touch sensor device may be reduced. Accordingly, a power consumption of the display device including the touch sensor device may also be reduced.

BRIEF DESCRIPTION OF THE DRAWINGS

The above and other features and advantages of the inventive concept will become more apparent by describing in detailed embodiments thereof with reference to the accompanying drawings, in which:

FIG. 6A is a table illustrating an embodiment of touch signal data of a first case;

FIG. 6B is a table illustrating an embodiment of touch signal data of a second case;

FIG. 7A is a table illustrating an embodiment of baseline data of the first case;

FIG. 7B is a table illustrating an embodiment of baseline data of the second case;

FIG. 11A is a table illustrating an embodiment of the baseline data of the first case;

FIG. 11B is a table illustrating an embodiment of the baseline data of the second case;

DETAILED DESCRIPTION OF THE EMBODIMENTS

Figure 1:
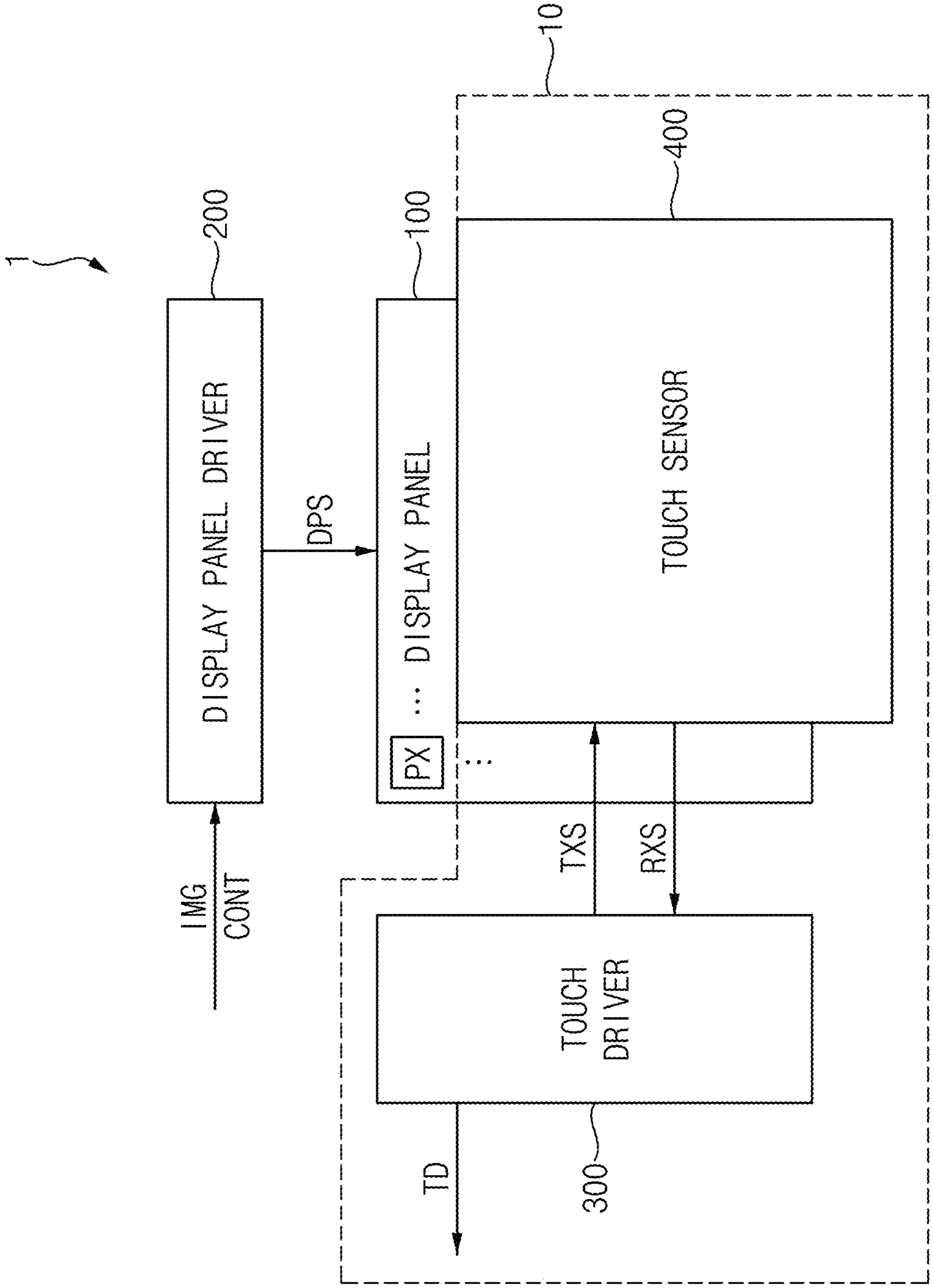
FIG. 1 is a block diagram illustrating a display device according to embodiments of the present inventive concept.

Hereinafter, display devices in accordance with embodiments will be described in more detail with reference to the accompanying drawings. The same reference numerals are used for the same components in the drawings, and redundant descriptions of the same components will be omitted.

Figure 2:
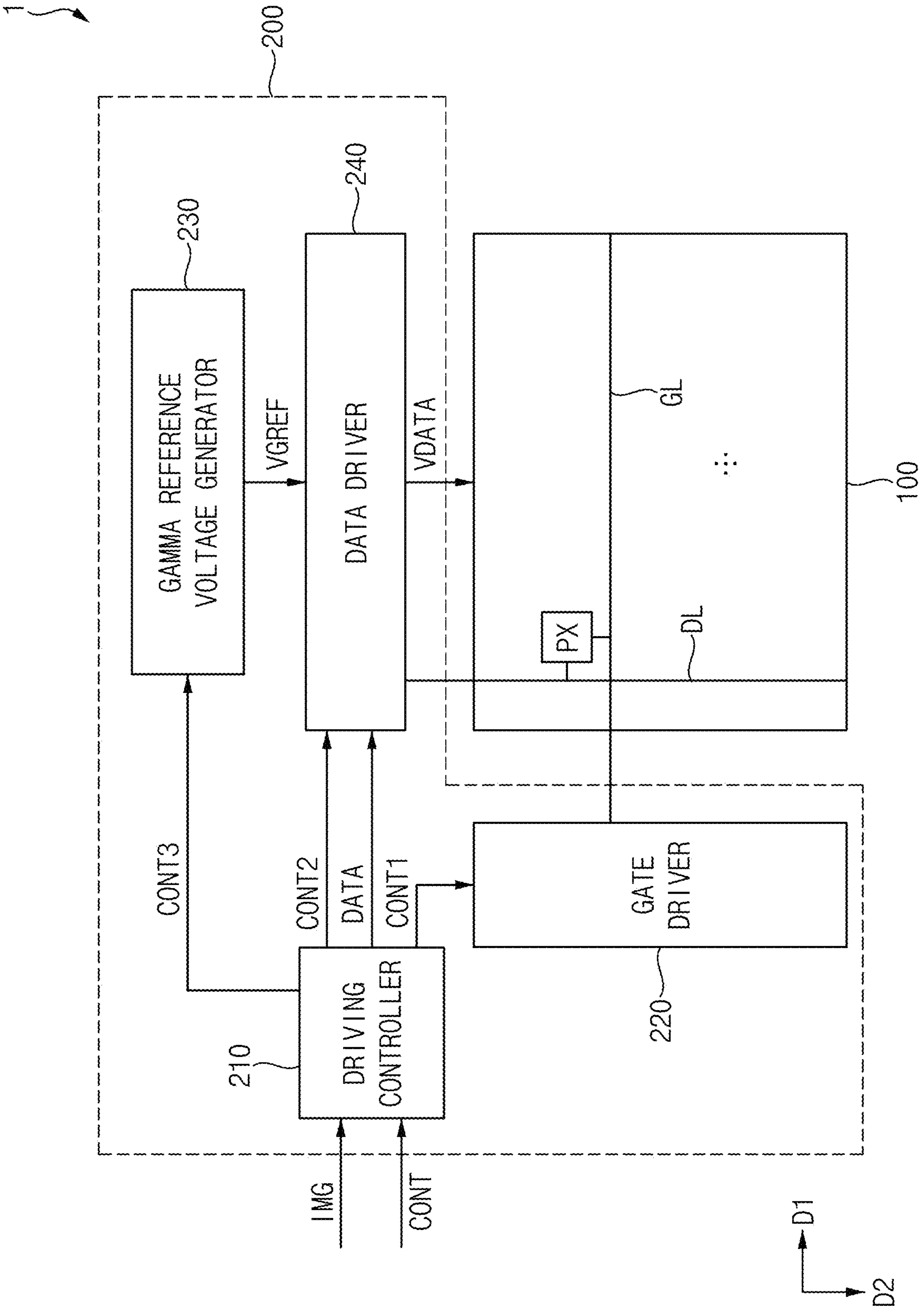
FIG. 2 is a block diagram illustrating a display panel and a display panel driver of FIG. 1.
Figure 3:
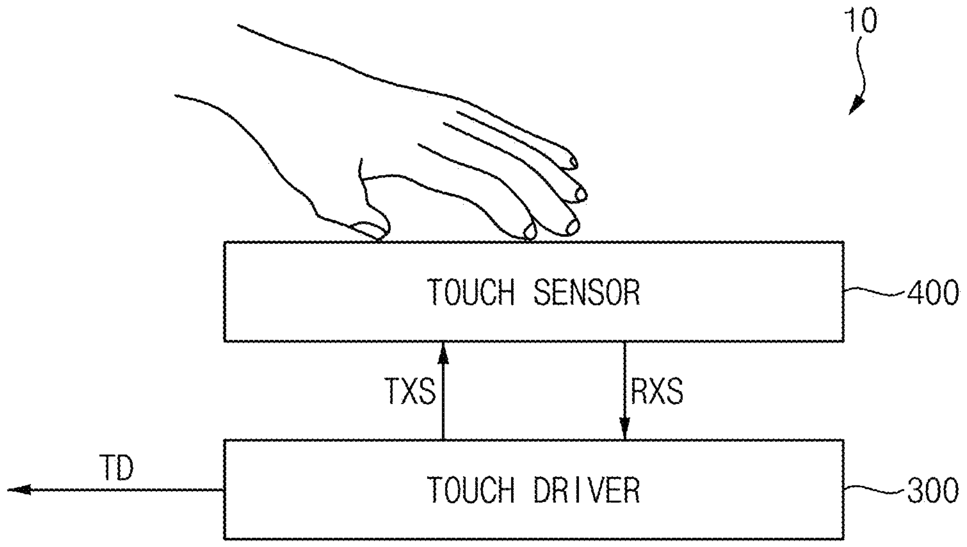
FIG. 3 is a diagram illustrating an operation of a touch sensor device of FIG. 1.
Figure 4:
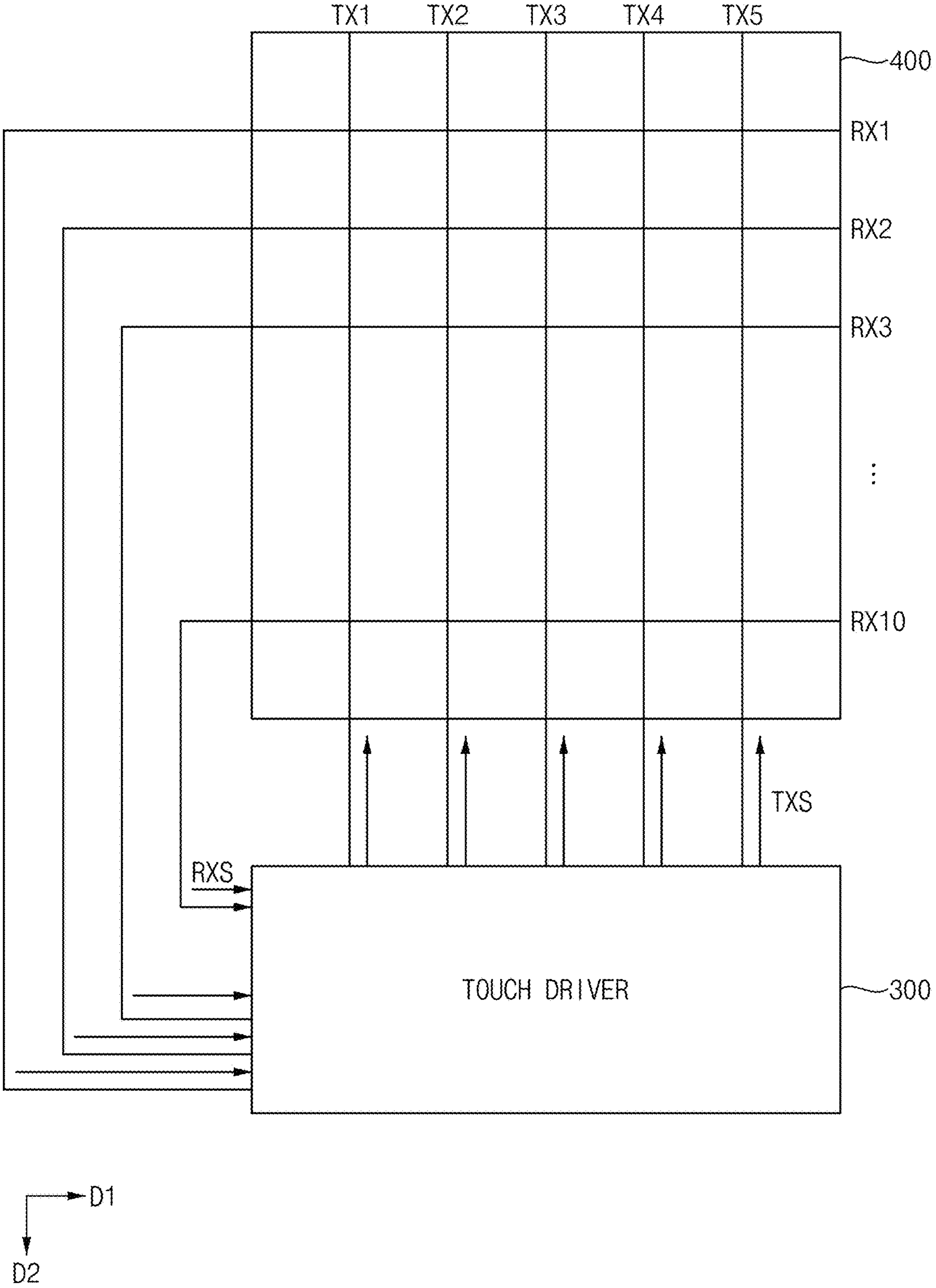
FIG. 4 is a diagram illustrating the touch sensor device of FIG. 1.

FIG. 1 is a block diagram illustrating a display device 1 according to embodiments of the present inventive concept. FIG. 2 is a block diagram illustrating a display panel 100 and a display panel driver 200 of FIG. 1. FIG. 3 is a diagram illustrating an operation of a touch sensor device 10 of FIG. 1. FIG. 4 is a diagram illustrating the touch sensor device 10 FIG. 1.

Referring to FIGS. 1 to 4, the display device 1 may include the display panel 100 and the display panel driver 200 and the touch sensor device 10.

The display panel driver 200 may include a driving controller 210, a gate driver 220, a gamma reference voltage generator 230 and a data driver 240.

The display panel driver 200 may generate a display panel driving signal DPS based on input image data IMG and an input control signal CONT, and may provide the display panel driving signal DPS to the display panel 100. The display panel driving signal DPS may include a plurality of gate signals and a plurality of data signals, but the display panel driving signal DPS is not limited thereto.

In some embodiments, the driving controller 210 and the data driver 240 may be integrated. For example, the driving controller 210, the gamma reference voltage generator 230, and the data driver 240 may be integrally formed. A driving module including at least the driving controller 210 and the data driver 240 that are integrally formed may be referred to as a timing controller embedded data driver (TED).

The display panel 100 may have a display region on which an image is displayed and a peripheral region adjacent to the display region.

The display panel 100 may include a plurality of gate lines GL, a plurality of data lines DL and a plurality of pixels PX electrically connected to the gate lines GL, and the data lines DL. The gate lines GL may extend in a first direction D1 and the data lines DL may extend in a second direction D2 crossing the first direction D1.

The driving controller 210 may receive the input image data IMG and the input control signal CONT from an external device (e.g. an application processor (AP)). For example, the input image data IMG may include red image data, green image data and blue image data. In some embodiments, the input image data IMG may further include white image data. In another example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 210 may generate a gate control signal CONT1, a data control signal CONT2, a gamma control signal CONT3 and a data signal DATA based on the input image data IMG and the input control signal CONT.

The driving controller 210 may generate the gate control signal CONT1 for controlling an operation of the gate driver 220 based on the input control signal CONT, and may output the gate control signal CONT1 to the gate driver 220. The gate control signal CONT1 may include a vertical start signal and a gate clock signal.

The driving controller 210 may generate the data control signal CONT2 for controlling an operation of the data driver 240 based on the input control signal CONT, and may output the data control signal CONT2 to the data driver 240. The data control signal CONT2 may include a horizontal start signal and a load signal.

The driving controller 210 may generate the data signal DATA based on the input image data IMG. The driving controller 210 may output the data signal DATA to the data driver 240.

The driving controller 210 may generate the gamma control signal CONT3 for controlling an operation of the gamma reference voltage generator 230 based on the input control signal CONT, and may output the gamma control signal CONT3 to the gamma reference voltage generator 230.

The gate driver 220 may generate a plurality of gate signals driving the gate lines GL in response to the gate control signal CONT1 received from the driving controller 210. The gate driver 220 may output the gate signals to the gate lines GL. For example, the gate driver 220 may sequentially output the gate signals to the gate lines GL. For example, the gate driver 220 may be mounted on the peripheral region of the display panel 100. For example, the gate driver 220 may be integrated on the peripheral region of the display panel 100.

The gamma reference voltage generator 230 may generate a gamma reference voltage VGREF in response to the gamma control signal CONT3 received from the driving controller 210. The gamma reference voltage generator 230 may output the gamma reference voltage VGREF to the data driver 240.

In an embodiment, the gamma reference voltage generator 230 may be disposed in the driving controller 210, or in the data driver 240.

The data driver 240 may receive the data control signal CONT2 and the data signal DATA from the driving controller 210, and may receive the gamma reference voltages VGREF from the gamma reference voltage generator 230. The data driver 240 may convert the data signal DATA into the data voltages having an analog type using the gamma reference voltages VGREF. The data driver 500 may output a data voltage VDATA to the data lines DL.

The touch sensor device 10 may include a touch sensor 400 and a touch driver 300 for driving the touch sensor 400.

The touch driver 300 may sense a touch of a user through the touch sensor 400. For example, the touch driver 300 may sense the touch of the user when the user uses a wet towel. For example, the touch driver 300 may sense the touch of the user when the user uses a palm of the user.

The touch driver 300 may generate a plurality of touch driving signals TXS, provide the touch driving signals TXS to the touch sensor 400, and receive a plurality of touch sensing signals RXS from the touch sensor 400. The touch driver 300 may sense the touch of the user based on the touch sensing signals RXS. In response to the touch sensing signals RXS, the touch driver 300 may generate touch data TD representing a sensed touch, and may provide the touch data TD to the display panel driver 200 or the external device.

In an embodiment, the touch sensor 400 may be a capacitance-type touch sensor sensing a capacitance change caused by the touch of the user. The touch sensor 400 may be disposed on the display panel 100. The touch sensor 400 may be mounted on one side of the display panel 100 or be formed within the display panel 100. For example, the touch sensor 400 may be formed by an OCTA (On Cell Touch AMOLED) type in which the touch sensor 400 is embedded in the display panel 100.

The touch sensor 400 may include a plurality of touch driving lines TX and a plurality of touch sensing lines RX. For convenience of explanation, it will be assumed that the touch sensor 400 includes first to fifth touch driving lines TX1 to TX5 and first to tenth touch sensing lines RX1 to RX10.

The touch driving lines TX may extend in the second direction D2, and the touch sensing lines RX may extend in the first direction D1 different from the second direction D2. In an embodiment, the second direction D2 may cross the first direction D1.

The touch driving lines TX may be connected to the touch driver 300 through driving channels, and the touch sensing lines RX may be connected to the touch driver 300 through sensing channels. The touch driver 300 may provide the touch driving signals TXS to the touch driving lines TX and receive the touch sensing signals RXS from the touch sensing lines RX. The touch sensing signals RXS may include current data CD.

Figure 5:
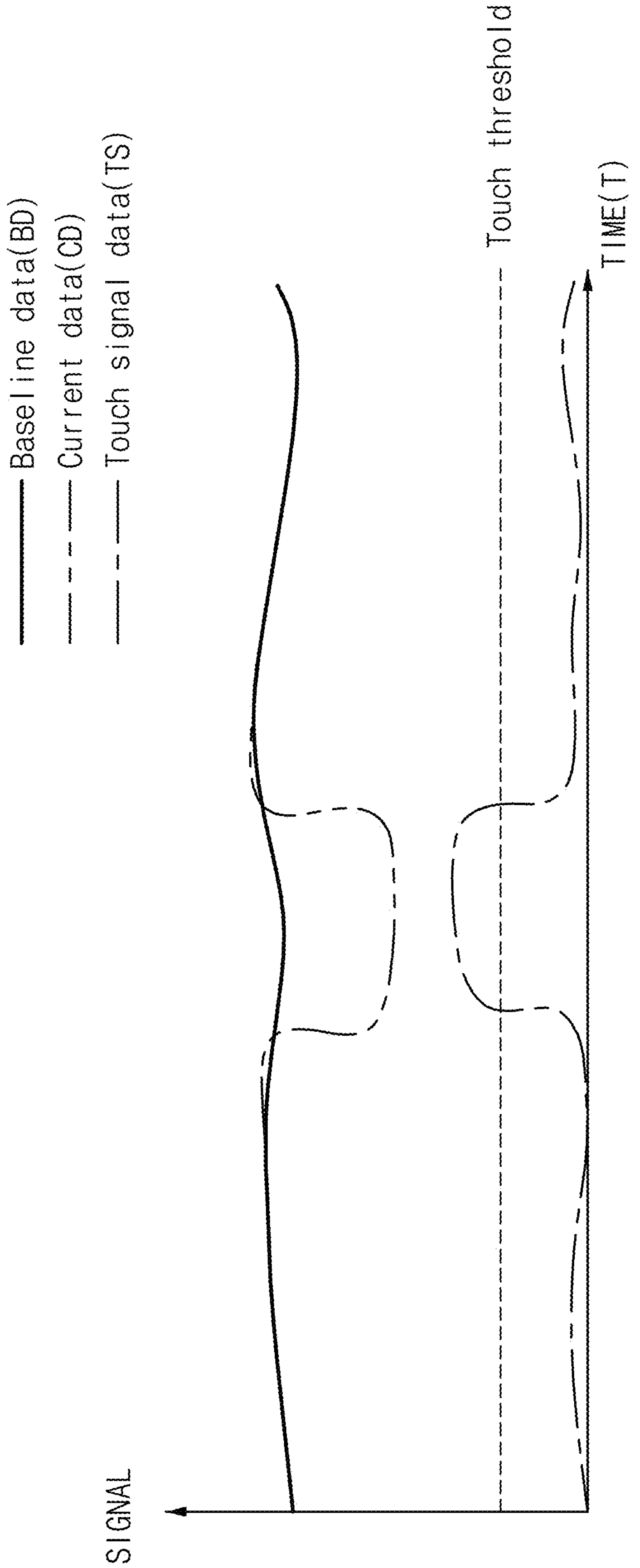
FIG. 5 is a graph illustrating the operation of the touch sensor device of FIG. 1.

FIG. 5 is a graph illustrating the operation of the touch sensor device 10 of FIG. 1.

Referring to FIGS. 1 to 5, the touch driver 300 may receive the current data CD. In addition, the touch driver 300 may store baseline data BD corresponding to an entire area of the touch sensor 400. The baseline data BD may be reference data of a touch recognition. For example, the touch driver 300 may store the baseline data BD in a look-up table (LUT). The touch driver 300 may continuously update the baseline data BD according to various environmental changes.

Each of the baseline data BD may correspond to areas where the touch driving lines TX and the touch sensing lines RX overlap or cross each other. In addition, the touch driver 300 may receive the current data CD of each of the areas where the touch driving lines TX and the touch sensing lines RX overlap.

In an embodiment, when no object is in contact with the touch sensor 400, the current data CD may be a signal similar to the baseline data BD. When the touch sensor 400 is touched by an object, levels of the current data CD may be lowered. In addition, the touch driver 300 may calculate touch signal data TS. The touch signal data TS may have levels that correlate with differences between the baseline data BD and the current data CD. When the touch signal data TS is greater than or equal to a predefined touch threshold value, the touch driver 300 may recognize that there is a touch.

Figure 8:
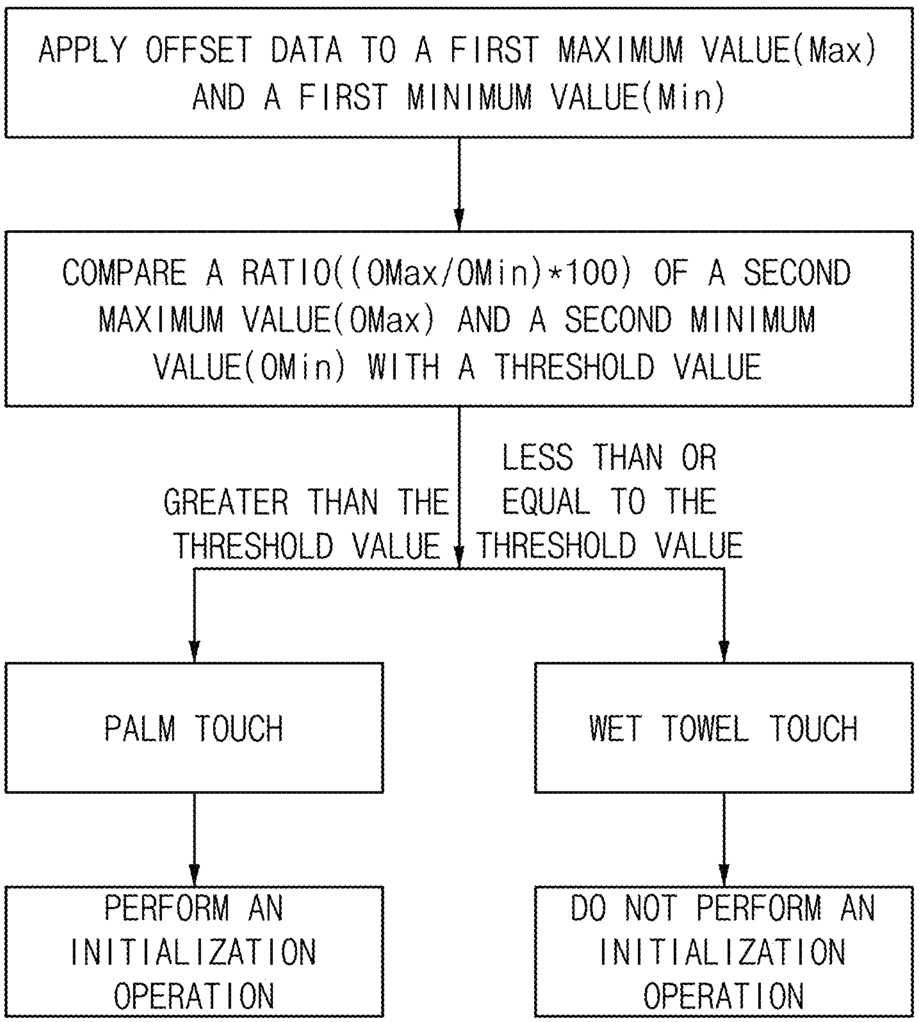
FIG. 8 is a flow chart illustrating an embodiment of an initialization operation of the baseline data of the touch driver of FIG. 1.

FIG. 6A is a table illustrating an embodiment of the touch signal data TS of a first case Case1. FIG. 6B is a table illustrating an embodiment of the touch signal data TS of a second case Case2. FIG. 7A is a table illustrating an embodiment of the baseline data BD of the first case Case1. FIG. 7B is a table illustrating an embodiment of the baseline data BD of the second case Case2. FIG. 8 is a flow chart illustrating an embodiment of an initialization operation of the baseline data BD of the touch driver 300 of FIG. 1.

Referring to FIGS. 1 to 6B, the first case Case1 and the second case Case2 are illustrated. In the first case Case1, the user touches the touch sensor 400 with the wet towel. In the second case Case2, the user briefly touches the touch sensor 400 with his palm and then the user removes the palm from the touch sensor 400. The second case Case2 may be referred to as a "palm on reset".

The touch driver 300 may determine the baseline data BD, which is a reference value that is used for touch recognition. In addition, the touch driver 300 may continuously update the baseline data BD based on a surrounding environment, a touch status, etc. In some cases, the baseline data BD may be set to when there is no touch. In other cases, if the display device 1 including the touch sensor device 10 is turned on while the touch sensor 400 is touched by the palm of the user, the touch driver 300 may initialize the baseline data BD based on a state in which the touch sensor 400 is touched by the palm of the user. in the latter case, the baseline data BD is set based on the state in which the touch sensor 400 is in contact with the palm of the user. With this baseline data BD, a ghost touch may occur in the display device 1 whereby something is recognized as a touch when it should not be. To prevent the ghost touch phenomenon, the touch driver 300 may perform the "palm on reset" operation which re-initializes the baseline data BD when the user removes the palm from the touch sensor 400.

When the user touches the touch sensor 400 with the wet towel and then removes the wet towel, the touch driver 300 may recognize the wet towel similarly to a case in which the user touches the touch sensor 400 with a palm and then removes the palm. When the user touches the touch sensor 400 with the wet towel, the touch driver 300 recognizes the situation as being similar to a case in which the user touches the touch sensor 400 with a palm and then removes the palm, causing the touch driver 300 to perform the palm on reset operation. The touch sensor is touched with the wet towel, so that the baseline data BD may be initialized based on a state in which the touch sensor 400 is in contact with the wet towel. The baseline data BD varies based on the state in which the touch sensor 400 is touched with the wet towel. If the baseline data BD is not updated after the wet towel is removed from contact, the ghost touch phenomenon may occur in the display device 1.

In an embodiment, an i[j]-th touch signal data TS may be the touch signal data corresponding to the area where an i-th touch driving line TXi and a j-th touch sensing line RXj overlap or cross each other. For example, a 1[1]-touch signal data TS may be the touch signal data corresponding to the area where a first touch driving line TX1 and a first touch sensing line RX1 overlap. In addition, a 1[2]-touch signal data TS may be the touch signal data corresponding to the area where the first touch driving line TX1 and a second touch sensing line RX2 overlap. In this way, a 2[1]-touch signal data TS may be the touch signal data corresponding to the area where a second touch driving line TX2 and the first touch sensing line RX1 overlap, and a 5[10]-touch signal data TS may be the touch signal data corresponding to the area where a fifth touch driving line TX5 and a tenth touch sensing line RX10 overlap.

Referring to FIG. 6A, which depicts the first case Case1, the touch signal data TS recognized as the touch may be a 2[2]-th touch signal data TS (e.g. 10000) and a 2[3]-th touch signal data TS (e.g. 6003). In the second case Case2 depicted in FIG. 6B, the touch signal data TS recognized as the touch may also be the 2[2]-th touch signal data TS (e.g. 10000) and the 2[3]-th touch signal data TS (e.g. 6003). That is, the touch signal data TS recognized as the touch may be the same in the first case Case1 and the second case Case2. Accordingly, the touch driver 300 may not be able to accurately distinguish between the first case Case1 and the second case Case2 using only the touch signal data TS.

A reference is needed to accurately distinguish between the first case Case1 in which the touch sensor 400 is touched with the wet towel and the second case Case2 in which the touch sensor 400 is touched with the palm of the user. Once this distinction is made, the baseline data BD may be made in one of the cases and not the other.

Referring to FIGS. 1 to 8, the touch driver 300 may compare the baseline data BD to distinguish between the first case Case1 and the second case Case2.

In the first case Case1, the touch driver 300 may determine the baseline data BD and store the baseline data BD. The baseline data BD may be different for each area where the touch driving lines TX and the touch sensing lines RX overlap.

In an embodiment, an i[j]-th baseline data BD may be the touch recognition reference of the area where the i-th touch driving line TXi and the j-th touch sensing line RXj overlap. For example, an 1[1]-th baseline data BD may be the touch recognition reference of the area where the first touch driving line TX1 and the first touch sensing line RX1 overlap. A 1[2]-th baseline data BD may be the touch recognition reference of the area where the first touch driving line TX1 and the second touch sensing line RX2 overlap. In this way, a 2[1]-th baseline data BD may be the touch recognition reference of the area where the second touch driving line TX2 and the first touch sensing line RX1 overlap, and a 5[10]-th baseline data BD may be the touch recognition reference of the area where the fifth touch driving line TX5 and the tenth touch sensing line RX10 overlap.

For example, as depicted in the example of FIG. 7A, the 1[1]-th baseline data BD may be 11326 in the first case Case1. The 1[2]-th baseline data BD may be 11319 in the first case Case1. The 2[1]-th baseline data BD may be 11320 in the first case Case1. The 5[10]-th baseline data BD may be 11129 in the first case Case1.

For example, as depicted in the example of FIG. 7B, the 1[1]-th baseline data BD may be 11680 in the second case Case2. The 1[2]-th baseline data BD may be 11671 in the second case Case2. The 2[1]-th baseline data BD may be 11672 in the second case Case2. The 5[10]-th baseline data BD may be 11449 in the second case Case2. Unlike in the example of FIG. 6A and FIG. 6B, the first case Case1 and the second case Case2 are easily distinguishable in the example of FIG. 7A and FIG. 7B.

In an embodiment, the touch driver 300 may determine a first maximum value Max among the baseline data BD, and may determine a first minimum value Min among the baseline data BD. In addition, the touch driver 300 may calculate a second maximum value OMax by applying offset data to the first maximum value Max and a second minimum value OMin by applying the offset data to the first minimum value Min. For example, the offset data may be determined by a display device designer when the display device 1 is designed. For example, the touch driver 300 may calculate the second maximum value OMax by subtracting the offset data from the first maximum value Max and the second minimum value OMin by subtracting the offset data from the first minimum value Min.

The touch driver 300 may calculate a ratio of the second maximum value OMax and the second minimum value OMin. The ratio of the second maximum value OMax and the second minimum value OMin may be calculated as (OMax/OMin)*100, wherein OMax is the second maximum value OMax and OMin is the second minimum value OMin.

In addition, the touch driver 300 may compare the ratio of the second maximum value OMax and the second minimum value OMin to a threshold value. The threshold value is a reference value for distinguishing between the first case CASE1 and the second case CASE2. For example, the threshold value may be determined by the display device designer when the display device 1 is designed.

The touch driver 300 may categorize the situation as the second case Case2 when the ratio of the second maximum value OMax and the second minimum value OMin is greater than the threshold value. If the touch driver 300 determines that the situation is the second case Case2, the touch driver 300 may initialize the baseline data BD.

The touch driver 300 may categorize the situation as the first case Case1 if the ratio of the second maximum value OMax and the second minimum value OMin is less than or equal to the threshold value. If the touch driver 300 determines that the situation is the first case Case1, the touch driver 300 may not initialize the baseline data BD.

For example, the first maximum value Max1 of the baseline data BD at the different positions may be the 1[1]-th baseline data BD, and the 1[1]-th baseline data may be 11326. The touch driver 300 may set 11326 as the first maximum value Max1. In addition, the first minimum value Min1 among the baseline data BD at the different positions may be a 3[8]-th baseline data BD, and the 3[8]-th baseline data BD may be 11097. Thus, the touch driver 300 may set 11097 as the first minimum value Min1.

The offset data may be 9000. For example, the display device designer may determine the offset data to be 9000. The touch driver 300 may calculate the second maximum value OMax by subtracting the offset data from the first maximum value Max1 and the second minimum value OMin by subtracting the offset data from the first minimum value Min1. Accordingly, the touch driver 300 may set the second maximum value Omax to be 2326 by subtracting 9000 from 11326. In addition, the touch driver 300 may set the second minimum value Omin to be 2097 by subtracting 9000 from 11097.

The touch driver 300 may calculate the ratio of the second maximum value OMax and the second minimum value OMin. The ratio of the second maximum value OMax and the second minimum value OMin may be calculated by "(OMax/OMin)*100", where OMax is the second maximum value OMax and OMin is the second minimum value OMin.

The ratio of the second maximum value OMax and the second minimum value OMin may be "(2326/2097)*100=about 111". The threshold value may be 114. The ratio of the second maximum value OMax and the second minimum value OMin is less than the threshold value, so that the touch driver may determine the situation to be the first case Case1. Accordingly, the touch driver 300 may not initialize the baseline data BD.

For example, the first maximum value Max2 among the baseline data BD may be the 1[1]-th baseline data BD, and the 1[1]-th baseline data may be 11680. That is, the touch driver 300 may set 11680 as the first maximum value Max2. In addition, the first minimum value Min2 among the baseline data BD may be a 4[5]-th baseline data BD, and the 4[5]-th baseline data BD may be 11213. That is, the touch driver 300 may set 11213 as the first minimum value Min2.

The offset data may be 9000. The touch driver 300 may calculate the second maximum value OMax by subtracting the offset data from the first maximum value Max2 and the second minimum value OMin by subtracting the offset data from the first minimum value Min2. Accordingly, the touch driver 300 may set 2680 as the second maximum value OMax by subtracting 9000 from 11680. In addition, the touch driver 300 may set 2213 as the second minimum value OMin by subtracting 9000 from 11213.

The touch driver 300 may calculate the ratio of the second maximum value OMax and the second minimum value OMin. The ratio of the second maximum value OMax and the second minimum value OMin may be calculated by (OMax/OMin)*100, wherein OMax is the second maximum value OMax and OMin is the second minimum value OMin.

The ratio of the second maximum value OMax and the second minimum value OMin may be "(2680/2213)*100=about 121". The threshold value may be 114. For example, the display device designer may determine the threshold voltage to be 114. The ratio of the second maximum value OMax and the second minimum value OMin is greater than the threshold value, so that the touch driver may determine the situation to be the second case Case2. Accordingly, the touch driver 300 may initialize the baseline data BD. The initialization applies to the baseline data BD at different positions throughout the predetermined area, which may be the area of the touch sensor 400.

The touch driver 300 may distinguish between the first case Case1 and the second case Case2 by comparing the threshold value and the ratio of the second maximum value OMax and the second minimum value OMin. The touch driver 300 may determine whether to initialize the baseline data BD based on whether the situation is the first case Case1 or the second case Case2. The touch driver 300 does not initialize the baseline data BD in the first case Case1, but the touch driver 300 initializes the baseline data BD in the second case Case2. Thus, the baseline data BD may be updated in the second case Case2 but not in the first case Case1. If the baseline data BD is updated, the chances of touch recognition error occurring in the touch sensor device 10 is significantly reduced. For example, the ghost touch phenomenon wherein the touch driver recognizes a touch when it should not, may not occur in the touch sensor device 10 if the base line data BD is updated. Accordingly, reliability and stability of the touch sensor device 10 may be improved. The reliability and stability of the touch sensor device 10 being improved in turn improves the reliability and stability of the display device 1 including the touch sensor device 10.

The touch driver 300 does not initialize the baseline data BD in the first case Case1. As a result, power consumption of the touch sensor device 10 may be reduced. Accordingly, power consumption of the display device 1 including the touch sensor device 10 may also be reduced.

Figure 9:
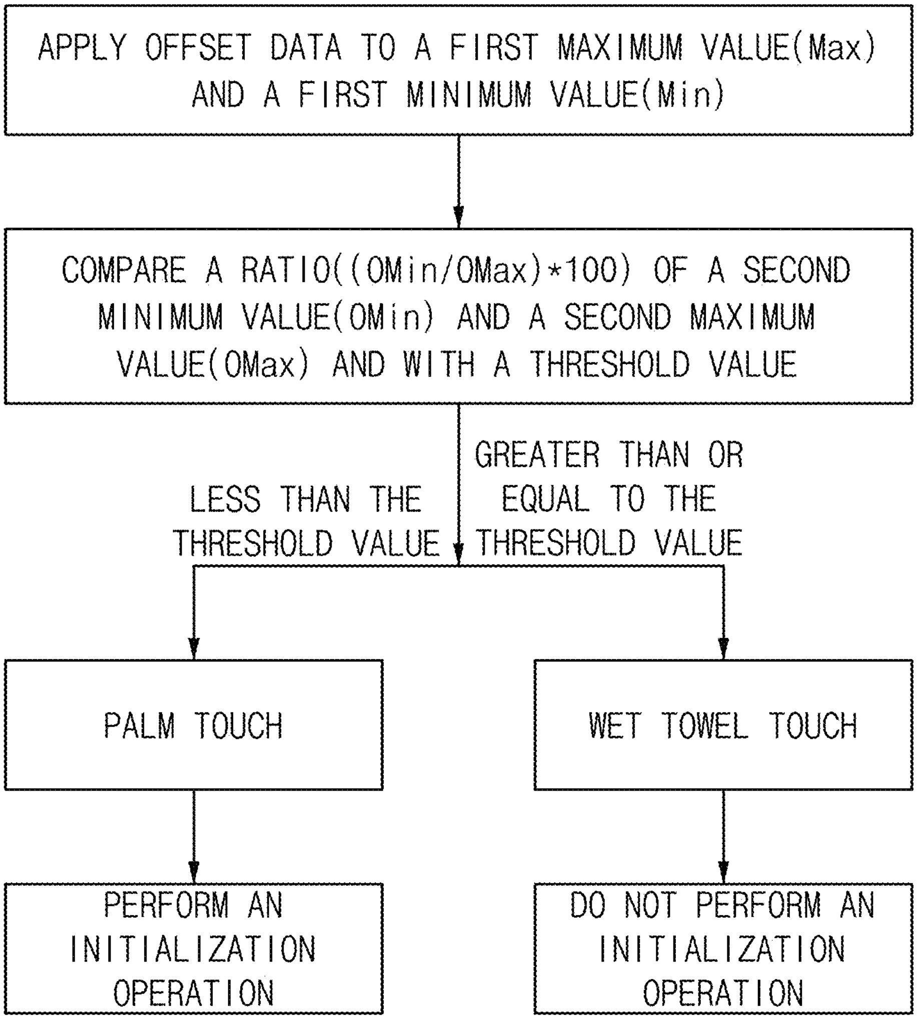
FIG. 9 is a flow chart illustrating an embodiment of an initialization operation of the baseline data of the touch driver of FIG. 1.

FIG. 9 is a flow chart illustrating an embodiment of an initialization operation of the baseline data BD of the touch driver 300 of FIG. 1.

Referring to FIGS. 1 to 7 and 9, the touch driver 300 may compare the baseline data BD to distinguish between the first case Case1 and the second case Case2.

The flow chart of FIG. 9 is substantially the same as the flow chart of FIG. 8 except for an equation for calculating the ratio of the second maximum value OMax and the second minimum value OMin and a reference for determining the first case Case1 and the second case Case2. Thus, the same reference numerals will be used to refer to the same or like parts as those described in the previous embodiment of FIG. 8 and any repetitive explanation concerning the above elements will be omitted.

In an embodiment, the touch driver 300 may calculate the ratio of the second minimum value OMin to the second maximum value OMax. The ratio of the second minimum value OMin and the second maximum value OMax may be calculated as (OMin/OMax)*100, wherein OMax is the second maximum value OMax and OMin is the second minimum value OMin.

In addition, the touch driver 300 may compare the ratio of the second minimum value OMin and the second maximum value OMax with the threshold value.

The touch driver 300 may categorize the situation as the second case Case2 if the ratio of the second minimum value OMin to the second maximum value OMax is less than the threshold value. When the touch driver 300 determines the situation to be the second case Case2, the touch driver 300 may initialize the baseline data BD.

The touch driver 300 may determine the situation to be the first case Case1 when the ratio of the second minimum value OMin to the second maximum value OMax is greater than or equal to the threshold value. When the touch driver 300 determines that the situation is the first case Case1, the touch driver 300 may not initialize the baseline data BD.

For example, the first maximum value Max1 among the various baseline data BD at different positions may be the 1[1]-th baseline data BD, and the 1[1]-th baseline data may be 11326. That is, the touch driver 300 may set 11326 as the first maximum value Max1. In addition, the first minimum value Min1 among the baseline data BD may be the 3[8]-th baseline data BD, and the 3[8]-th baseline data BD may be 11097. That is, the touch driver 300 may set 11097 as the first minimum value Min1.

The offset data may be 9000. The touch driver 300 may calculate the second maximum value OMax by subtracting the offset data from the first maximum value Max1 and the second minimum value OMin by subtracting the offset data from the first minimum value Min1. Accordingly, the touch driver 300 may set the second maximum value OMax to be 2326 by subtracting 9000 from 11326. In addition, the touch driver 300 may set the second minimum value OMin to be 2097 by subtracting 9000 from 11097.

The touch driver 300 may calculate the ratio of the second minimum value OMin and the second maximum value OMax. The ratio of the second minimum value OMin and the second maximum value OMax may be calculated as (OMin/OMax)*100, wherein OMax is the second maximum value OMax and OMin is the second minimum value OMin.

The ratio of the second minimum value OMin and the second maximum value OMax may be (2097/2326)*100=about 90. The threshold value may be 87. In this case, the ratio of the second minimum value OMin and the second maximum value OMax is greater than the threshold value, so that the touch driver may determine the situation to be the first case Case1 according to FIG. 9. Based on this determination, the touch driver 300 may not initialize the baseline data BD.

In the example of FIG. 11A and FIG. 11B, the first maximum value Max2 among the baseline data BD at different positions may be the 1[1]-th baseline data BD, and the 1[1]-th baseline data may be 11680. That is, the touch driver 300 may set 11680 as the first maximum value Max2. In addition, the first minimum value Min2 among the baseline data BD may be the 4[5]-th baseline data BD, and the 4[5]-th baseline data BD may be 11213. That is, the touch driver 300 may set 11213 as the first minimum value Min2.

The offset data may be 9000. The touch driver 300 may calculate the second maximum value OMax by subtracting the offset data from the first maximum value Max2 and the second minimum value OMin by subtracting the offset data from the first minimum value Min2. Accordingly, the touch driver 300 may determine the second maximum value OMax to be 2680 by subtracting 9000 from 11680 . . . . In addition, the touch driver 300 may determine the second minimum value OMin to be 2213 by subtracting 9000 from 11213.

The touch driver 300 may calculate the ratio of the second minimum value OMin and the second maximum value OMax. The ratio of the second minimum value OMin and the second maximum value OMax may be calculated by (OMin/OMax)*100, where OMax is the second maximum value OMax and OMin is the second minimum value OMin.

The ratio of the second minimum value OMin to the second maximum value OMax may be "(2213/2680)*100=about 83". The threshold value may be 87. In this case, the ratio of the second minimum value OMin and the second maximum value OMax is less than the threshold value, so the touch driver may determine the situation to be the second case Case2. Based on this determination, the touch driver 300 may initialize the baseline data BD (see FIG. 9).

The touch driver 300 may distinguish between the first case Case1 and the second case Case2 by comparing the threshold value and the ratio of the second maximum value OMax and the second minimum value OMin. The touch driver 300 may determine whether to initialize the baseline data BD by distinguishing between the first case Case1 and the second case Case2. The touch driver 300 does not initialize the baseline data BD in the first case Case1 and the touch driver 300 initializes the baseline data BD in the second case Case2, so that the baseline data BD may be updated. The updating of the baseline data BD reduces the likelihood of a touch recognition error occurring in the touch sensor device 10. For example, the updating may prevent the ghost touch phenomenon, which is when a touch is recognized when it should not be. Accordingly, reliability and stability of the touch sensor device 10 may be improved. The improved reliability and the stability of the touch sensor device 10 in turn improve the reliability and stability of the display device 1 including the touch sensor device 10.

In addition, the touch driver 300 does not initialize the baseline data BD in the first case Case1, so that power consumption of the touch sensor device 10 may be reduced. Accordingly, power consumption of the display device 1 including the touch sensor device 10 may also be reduced.

Figure 10:
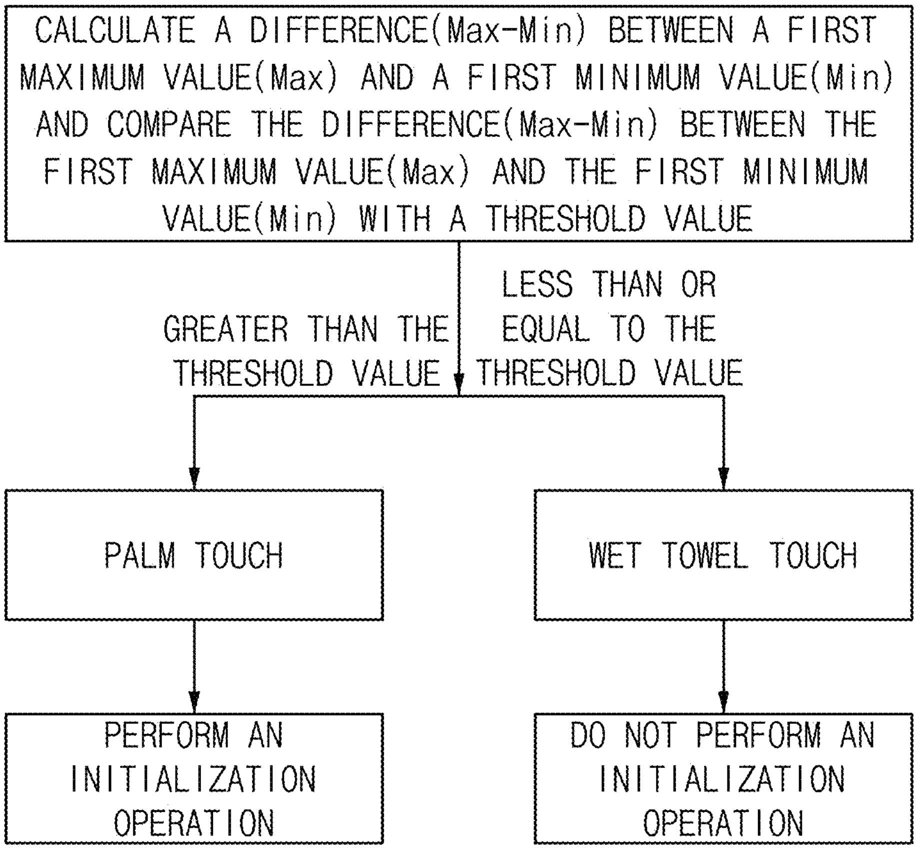
FIG. 10 is a flow chart illustrating an embodiment of an initialization operation of the baseline data of the touch driver of FIG. 1.

FIG. 10 is a flow chart illustrating an embodiment of an initialization operation of the baseline data BD of the touch driver 300 of FIG. 1.

Referring to FIGS. 1 to 7 and 10, the touch driver 300 may compare the baseline data BD to distinguish between the first case Case1 and the second case Case2.

The flow chart of FIG. 10 is substantially the same as the flow chart of FIG. 8 except that the touch driver 300 calculates a difference, rather than a ratio, between the first maximum value Max and the first minimum value Min. Thus, the same reference numerals will be used to refer to the same or like parts as those described in the previous embodiment of FIG. 8 and any repetitive explanation concerning the above elements will be omitted.

In an embodiment, the touch driver 300 may calculate the difference between the first maximum value Max and the first minimum value Min. The difference between the first maximum value Max and the minimum value Min may be calculated by "Max-Min," where Max is the first maximum value Max and Min is the first minimum value Min.

In addition, the touch driver 300 may compare the difference between the first maximum value Max and the minimum value Min with the threshold value.

The touch driver 300 may determine the situation to be the second case Case2 only if the difference between the first maximum value Max and the first minimum value Min is greater than the threshold value. When the touch driver 300 determines the situation to be the second case Case2, the touch driver 300 may initialize the baseline data BD.

The touch driver 300 may determine the situation to be the first case Case1 if the difference between the first maximum value Max and the first minimum value Min is less than or equal to the threshold value. When the touch driver 300 determines the first case Case1, the touch driver 300 may not initialize the baseline data BD.

For example, referring to FIG. 7A, the first maximum value Max1 among the baseline data BD may be the 1[1]-th baseline data BD, and the 1[1]-th baseline data may be 11326. That is, the touch driver 300 may set 11326 as the first maximum value Max1. In addition, the first minimum value Min1 among the baseline data BD may be the 3[8]-th baseline data BD, and the 3[8]-th baseline data BD may be 11097. That is, the touch driver 300 may set 11097 as the first minimum value Min1.

The touch driver 300 may calculate the difference between the first maximum value Max1 and the first minimum value Min1. The difference between the first maximum value Max1 and the first minimum value Min1 may be calculated as Max1−Min1, where Max1 is the first maximum value Max1 and Min1 is the first minimum value Min1.

The difference between the first maximum value Max1 and the first minimum value Min1 may be "11326−11097=229". The threshold value may be 300. In this case, the difference between the first maximum value Max1 and the first minimum value Min1 is less than the threshold value, so that the touch driver 300 may determine the situation to be the first case Case1. Based on this determination, the touch driver 300 may not initialize the baseline data BD.

In the example of FIG. 7B, the first maximum value Max2 among the baseline data BD may be the 1[1]-th baseline data BD, and the 1[1]-th baseline data may be 11680. That is, the touch driver 300 may set 11680 as the first maximum value Max2. In addition, the first minimum value Min2 among the baseline data BD may be the 4[5]-th baseline data BD, and the 4[5]-th baseline data BD may be 11213. That is, the touch driver 300 may set 11213 as the first minimum value Min2.

The touch driver 300 may calculate the difference between the first maximum value Max2 and the first minimum value Min2. The difference between the first maximum value Max2 and the first minimum value Min2 may be calculated as Max2−Min2, where Max2 is the first maximum value Max2 and Min2 is the first minimum value Min2.

The difference between the first maximum value Max2 and the first minimum value Min2 may be "11680−11213=467". The threshold value may be 300. In this case, the difference between the first maximum value Max2 and the first minimum value Min2 is greater than the threshold value, so that the touch driver 300 may determine the situation to be the second case Case2. Based on this determination, the touch driver 300 may initialize the baseline data BD.

The touch driver 300 may distinguish between the first case Case1 and the second case Case2 by comparing the threshold value and the difference between the first maximum value Max and the first minimum value Min. The touch driver 300 may determine whether to initialize the baseline data BD by distinguishing between the first case Case1 and the second case Case2. The touch driver 300 does not initialize the baseline data BD in the first case Case1 and the touch driver 300 initializes the baseline data BD in the second case Case2. With the initialization, the baseline data BD may be updated. The baseline data BD update reduces the likelihood of a touch recognition error occurring in the touch sensor device 10. For example, the baseline data BD update makes the ghost touch, which is when something is recognized as a touch when it should not be, unlikely to occur in the touch sensor device 10. Accordingly, reliability and stability of the touch sensor device 10 may be improved. The reliability and stability of the touch sensor device 10 is improved, in turn improving the reliability and stability of the display device 1 including the touch sensor device 10.

In addition, the touch driver 300 does not initialize the baseline data BD in the first case Case1, so that power consumption of the touch sensor device 10 may be reduced. Accordingly, power consumption of the display device 1 including the touch sensor device 10 may also be reduced.

FIG. 11A is a table illustrating an embodiment of the baseline data BD of the first case Case1. FIG. 11B is a table illustrating an embodiment of the baseline data BD of the second case Case2.

Referring to FIGS. 1 to 6B, 8, 11A and 11B, the touch driver 300 may compare two of the baseline data BD to distinguish between the first case Case1 and the second case Case2.

The tables of FIGS. 11A and 11B are substantially the same as the tables of FIGS. 7A and 7B except for a reference area SA for determining the first maximum value Max and the first minimum value Min. Thus, the same reference numerals will be used to refer to the same or like parts as those described in the previous embodiment of FIGS. 7A and 7B and any repetitive explanation concerning the above elements will be omitted.

In an embodiment, the touch driver 300 may determine the reference area SA. For example, the touch driver 300 may determine an area of the touch sensor 400, which excludes edge areas of the touch sensor 400 from the entire area of the touch sensor 400, as the reference area SA. The reference area SA may be a section of a larger, predetermined area, and the reference area SA may be useful for determining the first maximum value Max and the first minimum value Min. The reference area SA may be a partial area of the touch sensor 400, but the reference area SA is not limited thereto. For example, the reference area SA may be the same as the predetermined area (which may be the entire area) of the touch sensor 400.

The touch driver 300 may determine the first maximum value Max and the first minimum value Min among the baseline data BD included in the reference area SA.

As shown in FIG. 11A and FIG. 11B, the reference area SA may be an area that does not include any of the first touch driving line TX1, the first touch sensing line RX1, and the tenth touch sensing line RX10. In this example, the predetermined area includes the first touch driving line TX1, the first touching sensing line RX1, and the tenth touch sensing line RX10 as well as the reference area SA; hence, the reference area SA is a section of the predetermined area.

In the first case Case1, the first maximum value Max1' among the baseline data BD included in the reference area SA may be the 2[2]-th baseline data BD, and the 2[2]-th baseline data BD may be 11157. That is, the touch driver 300 may set 11157 as the first maximum value Max1'. In addition, the minimum value Min1 among the baseline data BD may be the 3[8]-th baseline data BD, and the 3[8]-th baseline data may be 11097. The touch driver 300 may set the 11097 as the first minimum value Min1 in the reference area SA.

In the second case Case2, the first maximum value Max2' among the baseline data BD included in the reference area SA may be the 2[2]-th baseline data BD, and the 2[2]-th baseline data BD may be 11582. That is, the touch driver 300 may set 11582 as the first maximum value Max2'. In addition, the minimum value Min2 among the baseline data BD may be the 4[5]-th baseline data BD, and the 4[5]-th baseline data may be 11213. The touch driver 300 may set the 11213 as the first minimum value Min2.

The touch driver 300 may distinguish between the first case Case1 and the second case Case2 by comparing the threshold value and the ratio of the second maximum value OMax and the second minimum value OMin. The touch driver 300 may determine whether to initialize the baseline data BD by distinguishing between the first case Case1 and the second case Case2. The touch driver 300 does not initialize the baseline data BD in the first case Case1 and the touch driver 300 initializes the baseline data BD in the second case Case2, so that the baseline data BD may be updated. The baseline data BD being updated reduces and maybe even prevents a touch recognition error from occurring in the touch sensor device 10. For example, a phenomenon such as a ghost touch, which is when a non-touch is recognized as a touch, may not occur in the touch sensor device 10. Accordingly, reliability and stability of the touch sensor device 10 may be improved. The reliability and the stability of the touch sensor device 10 is improved, in turn improving the reliability and stability of the display device 1 including the touch sensor device 10.

In addition, the touch driver 300 does not initialize the baseline data BD in the first case Case1, reducing the power consumption of the touch sensor device 10. Accordingly, power consumption of the display device 1 including the touch sensor device 10 may also be reduced.

Figure 12:
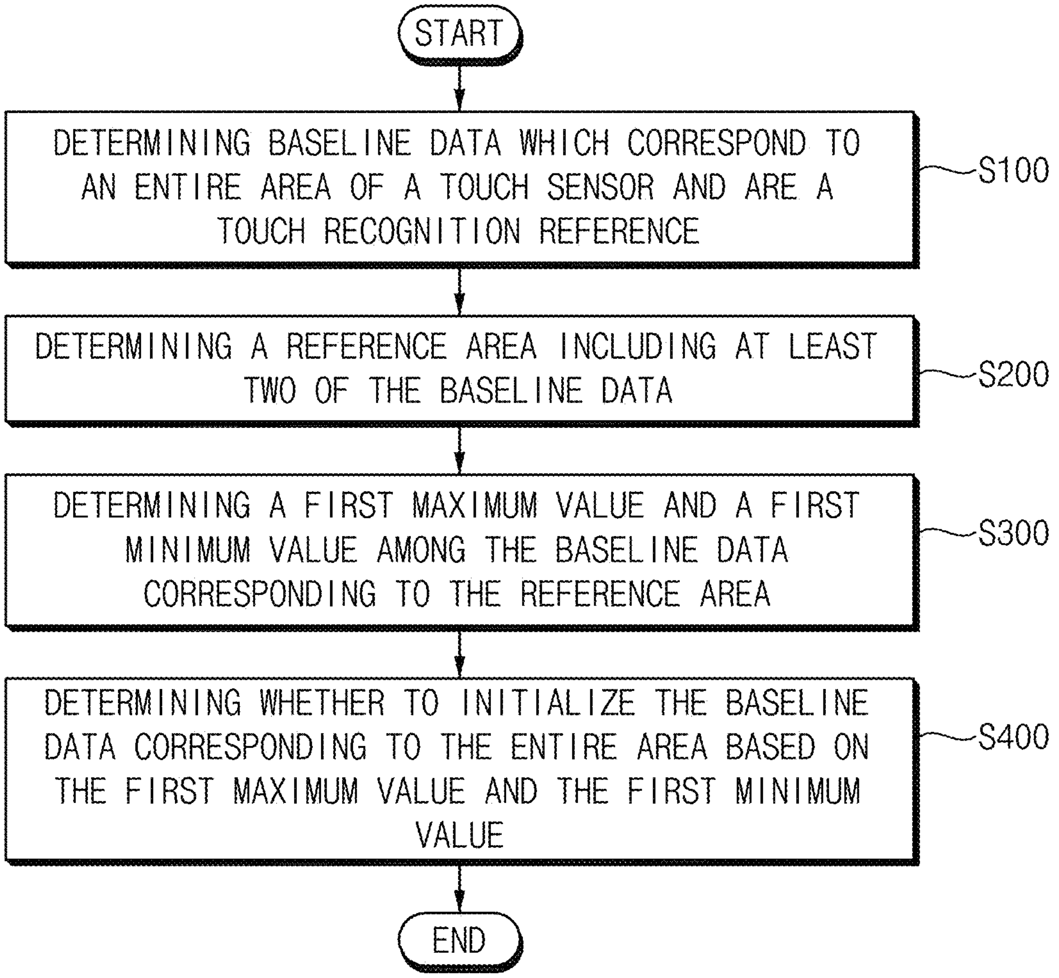
FIG. 12 is a flow chart illustrating a method of operating the touch sensor device of FIG. 1.

FIG. 12 is a flow chart illustrating a method of operating the touch sensor device 10 of FIG. 1.

Referring to FIGS. 1 to 12, the method of operating the touch sensor device 10 may include determining the baseline data BD, which correspond to the entire area of the touch sensor 400 and act as the touch recognition reference S100, determining the reference area including at least two of the baseline data BD S200, determining the first maximum value Max and the first minimum value Min among the baseline data BD corresponding to the reference area S300 and determining whether to initialize the baseline data BD corresponding to the entire area based on the first maximum value Max and the first minimum value Min S400.

The method of operating the touch sensor device 10 may be performed by the touch driver 300 included in the touch sensor device 10. In addition, an operation of the touch sensor device 10 may be substantially the same as an operation of the touch sensor device 10 described in FIGS. 1 to 11.

In determining the baseline data BD that correspond to the entire area of the touch sensor 400 and act as the touch recognition reference S100, the touch driver 300 may determine the baseline data BD corresponding to the entire area of the touch sensor 400, and may store the baseline data BD.

In determining the reference area including at least two of the baseline data BD S200, the touch driver 300 may determine the reference area SA. The reference area SA may include at least two of the baseline data BD.

The reference area SA may be the area for determining the first maximum value Max and the first minimum value Min. The reference area SA may be the partial area of the touch sensor 400, but the reference area SA is not limited thereto. For example, the reference area SA may be the entire area of the touch sensor 400.

In determining the first maximum value Max and the first minimum value Min among the baseline data BD corresponding to the reference area S300, the touch driver 300 may determine the first maximum value Max and the minimum value Min among the baseline data BD included in the reference area SA. For example, the touch driver 300 may determine the first maximum value Max and the first minimum value Min among the baseline data BD corresponding to the entire area of the touch sensor 400. For example, the touch driver 300 may determine the first maximum value Max and the first minimum value Min among the baseline data BD corresponding to the partial area of the touch sensor 400.

In determining whether to initialize the baseline data BD corresponding to the entire area based on the first maximum value Max and the first minimum value Min in process S400, the touch driver 300 may calculate the second maximum value OMax by applying the offset data to the first maximum value Max, and calculate the second minimum value OMin by applying the offset data to the first minimum value Min. In addition, the touch driver 300 may calculate the ratio of the second maximum value OMax and the second minimum value OMin. The touch driver 300 may distinguish between the first case Case1 and the second case Case2 by comparing the threshold value and the ratio of the second maximum value OMax and the second minimum value OMin (e.g., as shown in FIG. 8). The touch driver 300 may not initialize the baseline data BD in the first case Case1. The touch driver 300 may initialize the baseline data BD in the second case Case2.

The touch driver 300 may distinguish between the first case Case1 and the second case Case2 by comparing the threshold value and the ratio of the second maximum value OMax and the second minimum value OMin. The touch driver 300 may determine whether to initialize the baseline data BD by distinguishing between the first case Case1 and the second case Case2. The touch driver 300 does not initialize the baseline data BD in the first case Case1 and the touch driver 300 initializes the baseline data BD in the second case Case2, so that the baseline data BD may be updated. The baseline data BD are updated, so that a touch recognition error may not occur in the touch sensor device 10. For example, the ghost touch phenomenon, which is described above, may not occur in the touch sensor device 10. Accordingly, reliability and stability of the touch sensor device 10 may be improved. The reliability and stability of the touch sensor device 10 is improved, in turn improving the reliability and stability of the display device 1 including the touch sensor device 10.

In addition, the touch driver 300 does not initialize the baseline data BD in the first case Case1, so that power consumption of the touch sensor device 10 may be reduced. Accordingly, power consumption of the display device 1 including the touch sensor device 10 may also be reduced.

Figure 13:
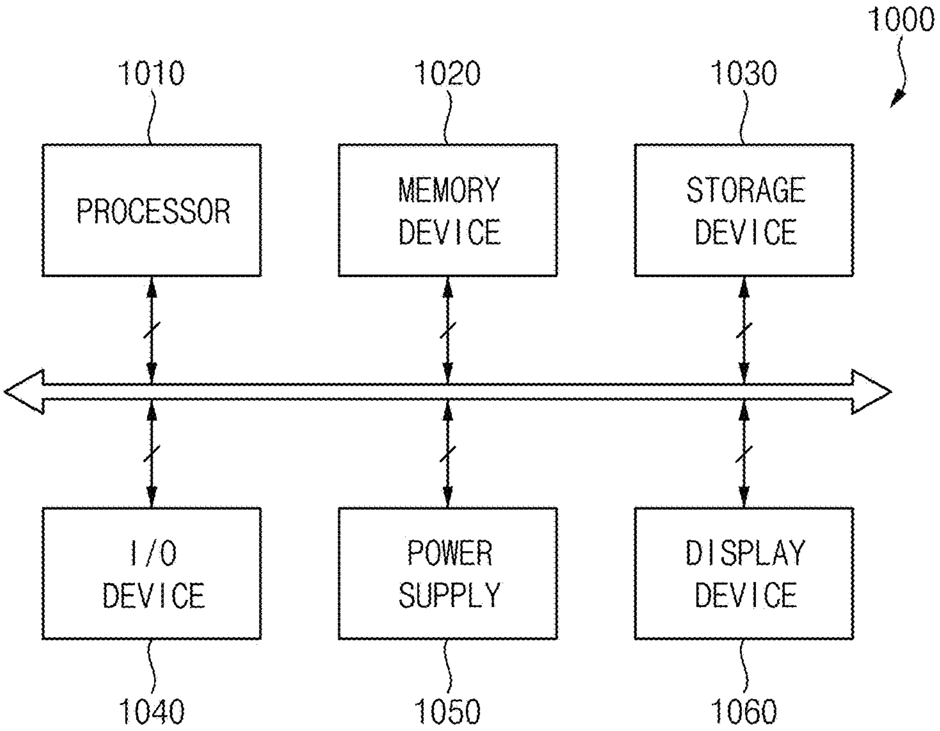
FIG. 13 is a block diagram illustrating an electronic device according to embodiments of the present inventive concepts.
Figure 14:
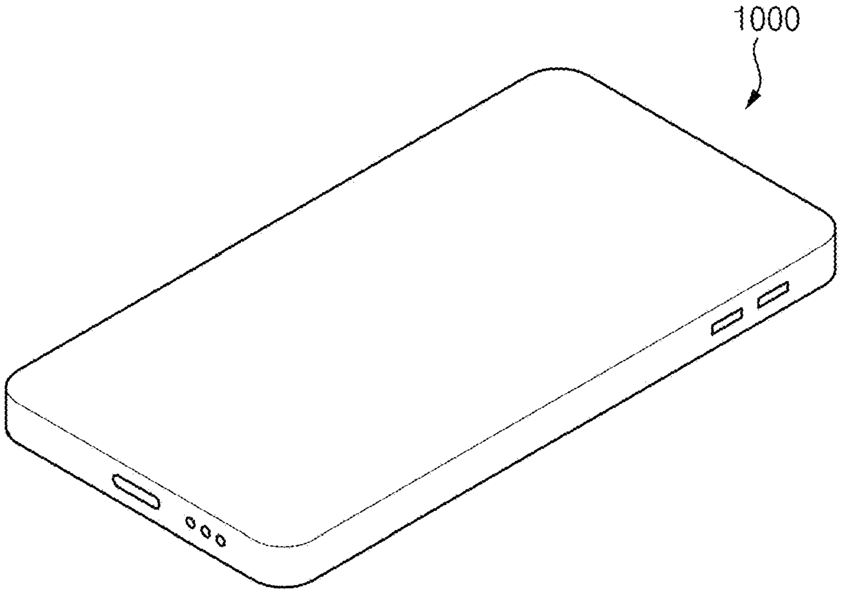
FIG. 14 is a diagram illustrating an embodiment in which the electronic device of FIG. 13 is implemented as a smart phone.

FIG. 13 is a block diagram illustrating an electronic device 1000 according to embodiments of the present inventive concepts. FIG. 14 is a diagram illustrating an embodiment in which the electronic device 1000 of FIG. 13 is implemented as a smart phone.

Referring to FIGS. 1 to 14, the electronic device 1000 may include a processor 1010, a memory device 1020, a storage device 1030, an input/output (I/O) device 1040, a power supply 1050 and a display device 1060. The display device 1060 may be the display device 1 of FIG. 1. In addition, the electronic device 1000 may further include ports for communicating with a video card, a sound card, a memory card, a universal serial bus (USB) device, other electronic device, and the like.

In an embodiment, as illustrated in FIG. 14, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The processor 1010 may output the input image data IMG and the input control signal CONT to the driving controller 210 of FIG. 2.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. According to an embodiment, the I/O device 1040 may include the display device 1060.

The power supply 1050 may provide power for operations of the electronic device 1000.

The display device 1060 may be connected to other components through buses or other communication links.

The display device 1060 may be the display device 1 of FIG. 1. The display device 1060 may further include the touch sensor device 10. The touch sensor device 10 may include the touch sensor 400 and the touch driver 300 for driving the touch sensor 400.

The touch driver 300 may distinguish between the first case Case1 and the second case Case2 by comparing the threshold value and the ratio of the second maximum value OMax and the second minimum value OMin. The touch driver 300 may determine whether to initialize the baseline data BD by distinguishing between the first case Case1 and the second case Case2. The touch driver 300 does not initialize the baseline data BD in the first case Case1 and the touch driver 300 initializes the baseline data BD in the second case Case2. With the initialization in the second case Case2, the baseline data BD may be updated so that a touch recognition error may not occur in the touch sensor device 10. For example, the ghost touch, which is described above, may not occur in the touch sensor device 10. Accordingly, reliability and stability of the touch sensor device 10 may be improved. The reliability and the stability of the touch sensor device 10 is improved, so that reliability and stability of the display device 1 including the touch sensor device 10 may be improved.

In addition, the touch driver 300 does not initialize the baseline data BD in the first case Case1, so that power consumption of the touch sensor device 10 may be reduced. Accordingly, power consumption of the display device 1 including the touch sensor device 10 may also be reduced.

The present inventive concepts may be applied to a display device and an electronic device including the display device. For example, the present inventive concepts may be applied to a television (TV), a digital TV, a 3D TV, a mobile phone, a smart phone, a tablet computer, a laptop computer, a personal computer (PC), a household electronic device, a personal digital assistant (PDA), a portable multimedia player (PMP), a digital camera, a music player, a portable game console, a navigation device, etc.

The foregoing is illustrative of the inventive concept and is not to be construed as limiting. Although a few embodiments of the inventive concept have been described as examples, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, any means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A touch sensor device comprising:

a touch sensor; and a touch driver configured to drive the touch sensor, wherein the touch driver is configured to:

determine baseline data for use as a touch recognition reference for a predetermined area of the touch sensor, define a reference area in the predetermined area, the reference area including at least two of the baseline data, determine a first maximum value and a first minimum value in the reference area, the first maximum value being a maximum value of the baseline data in the reference area and the first minimum value being a minimum value of the baseline data in the reference area, and determine whether to initialize the baseline data for the predetermined area based on the first maximum value and the first minimum value and initializing the baseline data for the predetermined area only if a comparison value calculated from the first maximum value and the first minimum value, satisfies a threshold.

2. The touch sensor device of claim 1, wherein the touch driver is configured to calculate a second maximum value by applying offset data to the first maximum value, and to calculate a second minimum value by applying the offset data to the first minimum value.

3. The touch sensor device of claim 2, wherein the touch driver is configured to calculate the second maximum value by subtracting the offset data from the first maximum value, and to calculate the second minimum value by subtracting the offset data from the first minimum value.

4. The touch sensor device of claim 2, wherein the touch driver is configured to generate the comparison value by calculating a ratio of the second maximum value and the second minimum value.

5. The touch sensor device of claim 4, wherein the ratio of the second maximum value and the second minimum value is calculated as (OMax/OMin)*100, wherein OMax is the second maximum value and OMin is the second minimum value.

6. The touch sensor device of claim 5, wherein the touch driver is configured to initialize the baseline data for the predetermined area only if the ratio of the second maximum value and the second minimum value is greater than a threshold value.

7. The touch sensor device of claim 4, wherein the ratio of the second minimum value to the second maximum value is calculated as (OMin/OMax)*100, wherein OMin is the second minimum value, and OMax is the second maximum value.

8. The touch sensor device of claim 7, wherein the touch driver is configured to initialize the baseline data for the predetermined area only if the ratio of the second minimum value to the second maximum value is less than a threshold value.

9. The touch sensor device of claim 1, wherein the touch driver is configured to initialize the baseline data for the predetermined area only if the comparison value, which is a difference between the first maximum value and the first minimum value is greater than a threshold value.

10. A display device comprising:

a display panel;

a display panel driver configured to drive the display panel;

a touch sensor disposed on the display panel; and a touch driver configured to drive the touch sensor, wherein the touch driver is configured to:

determine baseline data for a predetermined area of the touch sensor for use as a touch recognition reference, define a reference area including at least two of the baseline data, determine a first maximum value and a first minimum value in the reference area, the first maximum value being a maximum value of the baseline data in the reference area and a first minimum value being a minimum value of the baseline data in the reference area, and determine whether to initialize the baseline data for the predetermined area based on the first maximum value and the first minimum value and initializing the baseline data for the predetermined area only if a comparison value calculated from the first maximum value and the first minimum value, satisfies a threshold.

11. The display device of claim 10, wherein the touch driver is configured to calculate a second maximum value by applying offset data to the first maximum value, and to calculate a second minimum value by applying the offset data to the first minimum value.

12. The display device of claim 11, wherein the touch driver is configured to generate the comparison value by calculating a ratio of the second maximum value and the second minimum value.

13. The display device of claim 12, wherein the ratio of the second maximum value to the second minimum value is calculated by as (OMax/OMin)*100, wherein OMax is the second maximum value and OMin is the second minimum value.

14. The display device of claim 13, wherein the touch driver is configured to initialize the baseline data for the predetermined area only if the ratio of the second maximum value and the second minimum value is greater than a threshold value.

15. The display device of claim 10, wherein the touch driver is configured to initialize the baseline data for the predetermined area only if the comparison value, which is a difference between the first maximum value and the first minimum value is greater than a threshold value.

16. An electronic device comprising:

a processor configured to output an input control signal and input image data;

a display panel;

a display panel driver configured to drive the display panel based on the input control signal and the input image data;

a touch sensor disposed on the display panel; and a touch driver configured to drive the touch sensor, wherein the touch driver is configured to:

determine baseline data for a predetermined area of the touch sensor, for use as a touch recognition reference, define a reference area in the predetermined area, the reference area including at least two of the baseline data, determine a first maximum value and a first minimum value in the reference area, the first maximum value being a maximum value of the baseline data in the reference area and a first minimum value being a minimum value of the baseline data in the reference area, and determine whether to initialize the baseline data for the predetermined area based on the first maximum value and the first minimum value and initializing the baseline data for the predetermined area only if a comparison value calculated from the first maximum value and the first minimum value, satisfies a threshold.

17. The electronic device of claim 16, wherein the touch driver is configured to:

calculate a second maximum value by applying offset data to the first maximum value, calculate a second minimum value by applying the offset data to the first minimum value, and generate the comparison value by calculating a ratio of the second maximum value and the second minimum value.

18. The electronic device of claim 17, wherein the ratio of the second maximum value to the second minimum value is calculated as (OMax/OMin)*100, wherein OMax is the second maximum value and OMin is the second minimum value.

19. The electronic device of claim 18, wherein the touch driver is configured to initialize the baseline data for the predetermined area only if the ratio of the second maximum value to the second minimum value is greater than a threshold value.

20. The electronic device of claim 16, wherein the touch driver is configured to initialize the baseline data for the predetermined area only if the comparison value, which is a difference between the first maximum value and the first minimum value is greater than a threshold value.

* * * * *